United States Patent
Dirisala et al.

(10) Patent No.: US 7,330,846 B1
(45) Date of Patent: Feb. 12, 2008

(54) SYSTEM AND METHOD FOR FACILITATING A DISTRIBUTED SEARCH OF LOCAL AND REMOTE SYSTEMS

(75) Inventors: Siva K. Dirisala, San Mateo, CA (US); Vijay Pawar, Union City, CA (US); Wei Shen, San Mateo, CA (US); Sam Shank, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 432 days.

(21) Appl. No.: 10/071,415

(22) Filed: Feb. 8, 2002

(51) Int. Cl.
*G06F 17/30* (2006.01)

(52) U.S. Cl. ............ 707/3; 707/1; 707/9; 707/10; 705/26

(58) Field of Classification Search ............ 707/3, 707/10, 9; 705/25–27, 10
See application file for complete search history.

(56) References Cited

U.S. PATENT DOCUMENTS

| | | | |
|---|---|---|---|
| 5,193,065 A * | 3/1993 | Guerindon et al. ......... 700/106 |
| 6,023,683 A | 2/2000 | Johnson et al. |
| 6,055,516 A | 4/2000 | Johnson et al. |
| 6,064,980 A * | 5/2000 | Jacobi et al. ................. 705/26 |
| 6,070,158 A * | 5/2000 | Kirsch et al. .................. 707/3 |
| 6,473,750 B1 * | 10/2002 | Petculescu et al. ............ 707/3 |
| 6,505,172 B1 | 1/2003 | Johnson et al. |
| 6,601,061 B1 * | 7/2003 | Holt et al. ...................... 707/3 |
| 6,633,873 B1 * | 10/2003 | Nakamura ..................... 707/10 |
| 6,809,292 B2 * | 10/2004 | Spear et al. ............. 219/130.5 |
| 2002/0059204 A1 * | 5/2002 | Harris ............................. 707/3 |
| 2002/0077944 A1 * | 6/2002 | Bly et al. ...................... 705/35 |
| 2003/0097358 A1 * | 5/2003 | Mendez ......................... 707/3 |
| 2003/0112792 A1 * | 6/2003 | Cranor et al. ............... 370/352 |

OTHER PUBLICATIONS

Masum et al, "Browsing Local and Gloabal Information",1995, IPM Press, 13 pages.*
Temtanapat et al, "detection of Access control Flaws in A distributed Database System with Local site Autonomy", 1997, IEEE, pp. 85-93.*

* cited by examiner

*Primary Examiner*—Cam Linh Nguyen
(74) *Attorney, Agent, or Firm*—Park, Vaughan & Fleming LLP

(57) ABSTRACT

A system and method for performing a distributed search in response to a user request. In response to a search request received from a user at a local server, a request is spawned and transmitted to a remote site to search information at the remote site. Substantially in parallel with the remote search request, a search of local resources (e.g., catalog of products/services) is initiated. At the remote site (e.g., an electronic marketplace), the search is conducted in the proper context for the user (e.g., user identity, language, organization) and the results are returned to the local server. The local server merges the local and remote search results, applies any desired business logic (e.g., to screen the results by price, description or other criteria) and provides a uniform display to the user.

27 Claims, 2 Drawing Sheets

SYSTEM AND METHOD FOR FACILITATING A DISTRIBUTED SEARCH OF LOCAL AND REMOTE SYSTEMS

BACKGROUND

This invention relates to the field of computer systems. More particularly, a system and methods are provided for performing a distributed search (e.g., local and remote) in response to a user search request.

Many organizations operate internal systems and networks for providing information, ordering goods or services, and other purposes, to members or employees of the organization. For example, an electronic system may be implemented for facilitating procurement of supplies. The system may be available to all members or a subset of all members of the organization, thereby providing a central procurement service.

However, a centralized system may not possess or be able to provide all of the information needed by the organization's members. In particular, the centralized system may not always include the most recent data. Therefore, members may also require access to external systems or services that offer other, or more recent, data.

But, providing members access to external systems may be detrimental to the organization or the operation of its system. If, for example, a member must access an external procurement source (e.g., a supplier) in addition to or in place of the organization's central procurement service, the organization may lose some control over the procurement process. Controls over prices, quantities, suppliers and other aspects of purchases—controls that are enforced within the central service—are likely to be ineffective when members reach outside the organization. If a member were to bypass the central service to access an external source, the user's activity will be beyond the organization's control. And, it may be impossible to import information from the remote source to the central service.

Further, if access to an external information source is not covered by sufficient security practices, organizational data may be jeopardized. An organization's security efforts may adequately protect internal transactions, but external dealings may be vulnerable.

In addition, a member accessing an external system is likely to be faced with a different user interface than the interface offered by the organization's central service. Beyond the difficulty the member may have while working with the new interface, his or her productivity will suffer because of the time spent becoming familiar with the external system.

Thus, there is a need for a system and methods for facilitating access to information that is external to an organization on behalf of a member of the organization, while avoiding or minimizing the problems discussed above.

SUMMARY

In one embodiment of the invention, a system and methods are provided for facilitating a distributed search in response to an information request received from a user. In this embodiment, the user is a member of an organization operating a centralized information source that may possess only a subset of information desired or usable by the user. Therefore, the organization accesses an external information source to retrieve addition information without losing control over the selection of information presented to the user, or how it is presented.

In an embodiment of the invention implemented in conjunction with a central procurement service, a search request regarding a desired procurement action is received from a user. The central service spawns or initiates a request to one or more remote procurement information sources (e.g., a supplier, an electronic marketplace, an exchange) to conduct a search for items meeting the user's description. In addition, a search of the central procurement service is conducted. In this embodiment, the user may be unaware of the remote search or any connection to a remote source, although the user (and/or the central service) may be authenticated to the remote source.

When results of the remote search are received, if any, they are merged with results of the local search. Even though the remote procurement information source employs a user interface different from the user interface employed by the central service, all of the results may be presented with a single interface.

In another embodiment of the invention, the results of the remote search (and, possibly, the local search) are filtered through a set of procurement rules that limit or restrict the user's procurement options with respect to quantity, type, price or any other characteristic.

DETAILED DESCRIPTION

Figure 1:
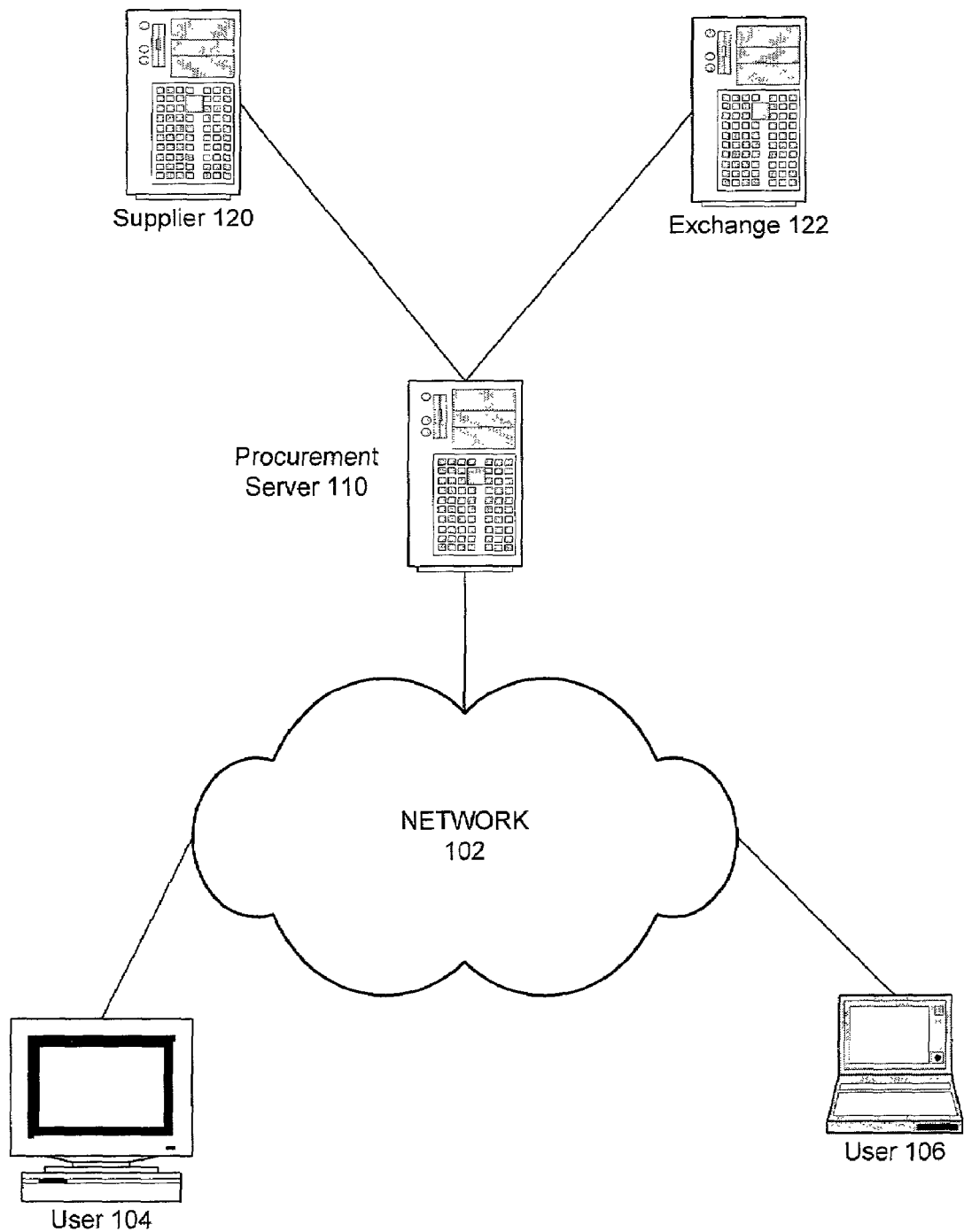
FIG. 1 is a block diagram depicting a system for facilitating a distributed search, in accordance with an embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a computer server, a general-purpose computer and/or a special purpose device such as a hand-held computer. Details of such devices (e.g., processor, memory, data storage, display) may be omitted for the sake of clarity.

It should also be understood that the techniques of the present invention may be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media).

Exemplary carrier waves may take the form of electrical, electromagnetic or optical signals conveying digital data streams along a local network, a publicly accessible network such as the Internet or some other communication link.

In one embodiment of the invention, a system and method are provided for facilitating or conducting a distributed search in response to a user request. The distributed search may comprise a search of a local service or source, and a remote source. Illustratively, the local source may be part of a central system operated by an organization (e.g., company, agency) for the use of its members (e.g., employees, agents) for obtaining information, ordering supplies or services, etc. In one alternative embodiment, a user request may spawn just one or more remote searches (i.e., without a local search).

In one or more embodiments of the invention described herein, the organization's central system comprises a centralized electronic procurement system for facilitating members' procurement of goods and/or services. However, other embodiments of the invention may be implemented for other types of electronic systems designed to provide other types of information or services to members.

An organization's central procurement system, or other centralized electronic information service, is often configured for use primarily (or only) by members, employees or agents of the organization. The members may be required to initiate or request procurement action through the centralized service. The service may offer various information regarding items approved for purchase. The service's information may be received from various suppliers of the items and may be tailored to the organization's needs or goals.

Typically, a member connects to the system through an organization intranet or other communication means, using HTTP (HyperText Transport Protocol) or HTTPS (Secure HTTP) or other suitable protocol, and logs in. The member then browses or searches for goods and/or services that are needed. If the member's needs are met within the system, a suitable purchase order or requisition may be generated to obtain the desired goods/services.

However, if the member's needs cannot be met within the organization's centralized system (e.g., the member requires a good or service never before required, the product information stored in the system is outdated or incomplete), access to an external system may be required to obtain the desired good or service, or information regarding the desired good or service.

In an embodiment of the invention, the organization's central procurement system is augmented with the ability to perform local and remote (e.g., external) searches for products and services (and/or information regarding products and services) for members of the organization. However, the central system retains sufficient control over the remote access to ensure that the exchange of information with remote sources is done securely, and that searches performed remotely are performed in appropriate contexts. Illustratively, a search context may be associated with a user identity, may depend upon a person's affiliation with the organization, a language or other criteria.

Further, results of remote searches are presented to members through a local interface, thereby preventing member confusion and masking, if desired, the source of the information. Yet further, the organization's procurement controls (e.g., over price, quantity, brand, source) can be applied to filter the remote search results.

Oracle Procurement, a product of Oracle Corporation, is one example of an electronic procurement system that an organization may implement to centralize its procurement activity, and is compatible with embodiments of the invention described herein.

FIG. 1 is a block diagram demonstrating one environment in which an embodiment of the invention may be implemented. An organization network 102 provides access to procurement server 110 for users 104, 106. Organization users may operate any of a variety of computing devices (e.g., desktop, laptop, handheld) and may connect to network 102 and server 110 using wired and/or wireless communication links. Procurement server 110, which may comprise a single computer system or multiple systems, operates a centralized procurement service for users within the organization.

Supplier 120 and exchange 122 comprise electronic systems, accessible from procurement server 110, for ordering and/or accessing information regarding products or services desired by a user. Procurement server 110 may access supplier 120 and/or exchange 122 through any type of communication link (e.g., wired or wireless, direct connection, network). For example, a communication link between procurement server 110 and either or both of supplier 120 and exchange 122 may comprise a network (e.g., the Internet) accessible via network 102.

Illustratively, supplier 120 comprises a source of goods or services (e.g., manufacturer, distributor) that organization members can procure through the organization's central procurement service, or a source of information regarding such goods or services information available through supplier 120 may duplicate information available at procurement server 110 and/or comprise more up-to-date information, information on competing products/services, etc.

Exchange 122 may comprise an electronic site (e.g., website, webpage), service or marketplace that facilitates transactions or the exchange of information between suppliers and purchasers. Thus, exchange 122 may be hosted by a particular supplier, a purchaser (e.g., the organization operating procurement server 110) or a neutral party (e.g., neither a supplier nor a purchaser).

In one embodiment of the invention, exchange 122 comprises Oracle Exchange, an electronic marketplace product offered by Oracle Corporation (see http://exchange.oracl.com). In this embodiment, the organization operating procurement server 110 may operate Oracle Procurement service in addition to being a partner of Oracle Exchange.

In the illustrated embodiment of the invention, an organization user (e.g., user 104, user 106) connects to procurement server 110 to procure, or obtain information regarding, a product or service. The user describes what is desired by entering a textual description, choosing from a menu, submitting one or more keywords, etc. Procurement server 110 may be configured to determine whether a search for information (e.g., products and/or services desired by a user) is to be conducted only locally (e.g., on server 110), locally and remotely (e.g., a remote supplier or exchange), or only remotely. Procurement server 110 may perform other functions in addition to the central procurement service.

The procurement server then spawns a thread or program module to initiate or request a search of supplier 120 and/or exchange 122 for products/services that satisfy the user's criteria. Also, a local search of procurement server 110 may be conducted to find suitable products/services that are already known. An embodiment of the invention may be generated using Java or another object-oriented programming language that facilitates multi-threading or other form of parallel program execution.

In the embodiment of FIG. 1, procurement server 110 connects to a remote source, such as exchange 122, using appropriate authentication and cryptographic security to protect the connection and ensure that each entity can verify the other's identity. Appropriate credentials or authentication information regarding the user that initiated a search may also be communicated to the remote source. Illustratively, a remote source contacted by procurement server 110 may maintain multiple user accounts, roles or identities to assign to users or connections from procurement server 110. Thus, different users within the organization may be connected to the remote source in different contexts, and remote searches may be granted appropriate privileges, scopes, etc.

In addition, the user may only need to provide his or her password or other credentials once (e.g., when connecting to the procurement server). The procurement server then establishes connections with remote sources, as needed, on behalf of the user.

Illustratively, the organization may receive special prices or deals from a particular vendor or provider. These special prices may be reflected in the information stored on procurement server 110. In addition, because procurement server 110 enables remote sources to verify the identity of the procurement server (and/or user), remote search results can reflect a special price or deal. Thus, at exchange 122, a search performed for organization user 106 returns any products and prices that have been customized for the organization. The remote search may, however, end with no results.

In a present embodiment of the invention, remote search requests and responses to the remote search requests are communicated via XML (eXtensible Markup Language). In other embodiments, other suitable protocols or languages may be implemented.

When results of a remote search are received at procurement server 110, they are merged with any local search results. The remote (and/or local) results may be filtered according to predetermined or dynamic rules. For example, the organization may place an upper limit on the price or quantity of items a user may procure (which may depend on the particular item and/or user), prevent a user from procuring an item from a particular supplier, limit purchases of a particular product to certain brands or models, etc.

The search results are then presented to the requesting user with a uniform user interface. In particular, by merging the remote results with the local results, the user is not confronted with different interfaces for the local and remote results.

Figure 2:
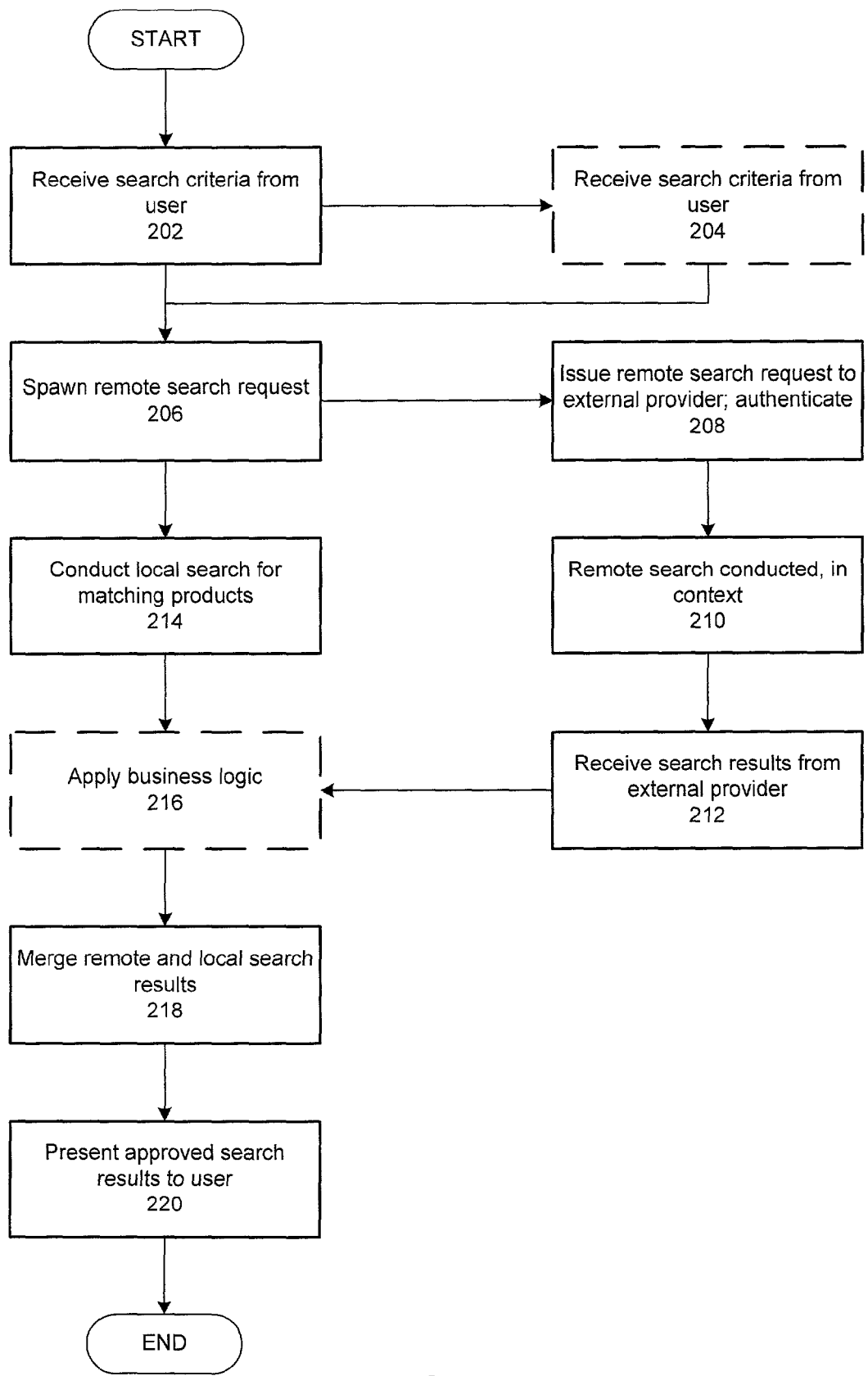
FIG. 2 is a flowchart illustrating one method of facilitating a distributed search in accordance with an embodiment of the invention.

FIG. 2 demonstrates a method of facilitating a distributed search, according to one embodiment of the invention. In the illustrated method, a user (e.g., employee) within a company uses the company's central procurement system to order a product (e.g., pens). The illustrated method may be readily modified for other purposes (e.g., services other than procurement, information other than product information).

In state 202, the central procurement system receives a user's search criteria, which regard a product (or products) the user wishes to procure. The user may be required to log into the system or otherwise authenticate himself or herself.

The user may enter keywords concerning the product desired (e.g., "pen"), or may select a preconfigured choice. For example, the central procurement system may provide indexes, menus or other means of identifying or selecting a type of product (e.g., ballpoint pen, fountain pen), a particular brand (e.g., Bic, Sanford), a specific product (e.g., a specific brand and model of pen), etc.

In state 204, the central procurement system may identify one of multiple remote systems or sources (e.g., supplier, exchange) to search. Illustratively, selection of a remote source may depend upon a user's identity, privileges, desired product or other criteria.

In state 206, the system spawns a thread or executes a module to handle the remote portion of the distributed search. In this embodiment, the local and remote searches are performed in parallel.

In state 208, the system issues a search request to a selected remote entity (e.g., an electronic marketplace, a particular product supplier or vendor). The system may be configured (e.g., by an administrator) to communicate with specific entities, which may be identified by IP (Internet Protocol) address, URL (Uniform Resource Locator) or other network address. For example, all remote searches may be communicated to multiple entities (e.g., different vendors' systems) or just a single entity (e.g., http://oracle.exchange.com). As described above, different entities may be used for different searches, depending on the users' search criteria, the user's identity, the type of product (e.g., office supply, janitorial, maintenance), etc.

As part of issuing the search request, the central procurement system may provide various authenticating data or other means of identifying itself and/or the requesting user. Thus, the system may communicate the user's credentials, a username and password, a digital certificate associated with the company, and/or other information to the remote site. The company may choose to only communicate with remote entities that provide sufficient security when connecting to, or exchanging information with, the central procurement system.

Illustratively, the remote search request is communicated to the remote entity in XML, using a predetermined request/response protocol. In one implementation of this embodiment of the invention, the request may be configured according to an XML DTD (Document Type Definition) similar to the following:

```
<! ELEMENT SearchRequest (userInfo, searchInfo)>
<! ELEMENT userInfo (username, password)>
<! ELEMENT userName (#PCDATA)>
<! ELEMENT password (#PCDATA)>
<! ELEMENT searchInfo (searchText, langCode?, excNoPriceItems?)>
<! ELEMENT searchText (#PCDATA)>
<!ELEMENT langCode (#PCDATA)>
<! ELEMENT excNoPriceItems (#PCDATA)>
```

In this embodiment, virtually any remote entity that implements the request/response protocol employed by the procurement system may be used as a remote information source or supplier.

In state 210, an appropriate context is assigned and the search is conducted by the remote entity. The proper context may specify a language, time zone, user identity or classification, user organization (e.g., company name), approved or unapproved suppliers, and virtually any other information. By applying the proper context, the search will uncover any special offers that a supplier may be offering to the user's company.

In state 212, the remote search results are received at the central procurement system from the external source. As described above, the results may be returned to the system using a predetermined XML request/response protocol (or other pre-approved protocol). In one implementation of this embodiment, the remote results may be communicated according to an XML DTD similar to the following:

```
<! ELEMENT SearchResult (Catalog)>
<! ELEMENT Catalog (CatalogItem*)>
<! ELEMENT CatalogItem (IDStr, CatIDStr, DESCRIP-
   TION, UOM, PRICE, CURRENCY, SUPPLIER, CAT-
   EGORY, SUPPLIER_PART_NUM)>
   <! ELEMENT IDStr (#PCDATA)>
   <! ELEMENT CatIDStr (#PCDATA)>
   <! ELEMENT DESCRIPTION (#PCDATA)>
   <! ELEMENT UOM (#PCDATA)>
   <! ELEMENT PRICE (#PCDATA)>
   <! ELEMENT CURRENCY (#PCDATA)>
   <! ELEMENT SUPPLIER (#PCDATA)>
   <! ELEMENT CATEGORY (#PCDATA)>
   <! ELEMENT SUPPLIER_PART_NUM (#PCDATA)>
```

In state 214, a local search of the centralized procurement system is performed, possibly in parallel with the remote search. In this embodiment, the total time needed to respond to the user's search is minimized by performing the searches in parallel. In other embodiments, however, the searches may be conducted serially.

In optional state 216, the company (e.g., the central procurement system) may apply procurement rules, functional security constraints, or business logic to filter the results of the remote and/or local searches. Illustratively, the search results may be filtered to apply a price or quantity limit, restrict delivery options, specify payment terms, and/or any other terms of a procurement transaction. The rules that are applied may be specific to the user, the type of product being ordered, or some other criteria.

In state 218, the search results are merged for presentation to the user. Thus, although the remote results may be received in one format, they may be reformatted to match the local results. Therefore, the user need not even be aware that some (or all) of the search results were retrieved from a remote source.

In state 220, the merged (and, possibly, filtered) search results are presented to the user. Depending on the procurement system, the user may select one or more options and corresponding purchase orders may then be initiated.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of facilitating a distributed search for a procurement request by a procurement server, the method comprising:
   receiving the procurement request from a user, wherein the procurement request is subject to organizational procurement controls, and wherein the procurement request involves requesting goods and/or services;
   using the organizational procurement controls to determine if the search involves a local search and/or a remote search;
   when the search involves a local search,
      initiating a local search of a local information source; and
      receiving results of the local search;
   when the search involves a remote search, the method further comprises:
      requesting a remote supplier to conduct a remote search to satisfy the procurement request, wherein the remote supplier is an external supplier and/or vendor who is located outside of the organization to which the user belongs, and wherein requesting the remote supplier involves including information that enables the remote supplier to verify the identity of the procurement server and/or the user;
      receiving results of the remote search, wherein the verification of the identity of the procurement server and/or the user enables the results of the remote search to be customized for the organization to which the user belongs;
      filtering the results of the remote search by applying the organizational procurement controls to the results of the remote search whereby the organizational procurement controls can be applied to results of the remote search which is performed by the remote supplier;
      masking the sources of information in the remote search result to prevent the user from purchasing from the remote supplier; and
      merging the results of the remote search, when the remote search is initiated, with the results of the local search, when the local search is initiated; and presenting said merged search results to the user.

2. The method of claim 1, further comprising:
   filtering said remote search results with a set of local rules.

3. The method of claim 2, wherein said filtering comprises editing said remote search results according to a set of rules regarding information that may be presented to the user.

4. The method of claim 1, further comprising:
   selecting said remote information source from multiple information sources.

5. The method of claim 1, wherein said remote search is conducted without the user being connected to the remote information source.

6. The method of claim 1, wherein the remote information source employs a user interface different from the user interface employed by the local information source.

7. The method of claim 6, wherein said presenting comprises displaying said merged search results with the user interface employed by the local information source.

8. The method of claim 1, wherein said remote search and said local search are performed at least partially in parallel.

9. The method of claim 1, wherein the organizational procurement controls include at least one of, an upper limit on a price, an upper limit on a quantity, a prohibition against a given supplier, a limit to a given brand, a limit to a given model, a limit on a delivery option, and a limit on payment terms.

10. The method of claim 1, wherein said requesting a remote supplier comprises identifying to the remote information source a context in which to execute the remote search.

11. The method of claim 10, wherein said context comprises an identity of the user.

12. The method of claim 10, wherein said context comprises an identity of an organization operating the local information source.

13. The method of claim 10, wherein said context comprises a language.

14. A computer readable storage medium storing instructions that, when executed by a computer, cause the computer to perform a computer-implemented method for facilitating a distributed search for a procurement request by a procurement server, the method comprising:
   receiving the procurement request from a user, wherein the procurement request is subject to organizational procurement controls, and wherein the procurement request involves requesting goods and/or services;

using the organizational procurement controls to determine if the search involves a local search and/or a remote search;

when the search involves a local search,
initiating a local search of a local information source; and
receiving results of the local search;

when the search involves a remote search, the method further comprises:
requesting a remote supplier to conduct a remote search to satisfy the procurement request, wherein the remote supplier is an external supplier and/or vendor who is located outside of the organization to which the user belongs, and wherein requesting the remote supplier involves including information that enables the remote supplier to verify the identity of the procurement server and/or the user;
receiving results of the remote search, wherein the verification of the identity of the procurement server and/or user enables the results of the remote search to be customized for the organization to which the user belongs;
filtering the results of the remote search by applying the organizational procurement controls to the results of the remote search whereby the organizational procurement controls can be applied to results of the remote search which is performed by the remote supplier;
masking the sources of information in the remote search result to prevent the user from purchasing from the remote supplier; and
merging the filtered results of the remote search, when the remote search is initiated, with the results of the local search, when the local search is initiated; and
presenting said merged search results to the user.

15. A method of conducting a distributed electronic search for a procurement request by a procurement server, concerning a desired procurement item, wherein the procurement request is subject to organizational procurement controls, and wherein the procurement request involves requesting goods and/or services, the method comprising:
receiving from a user a description of an item the user desires to procure;
using the organizational procurement controls to determine if the search involves a first search and/or a second search;
when the search involves a first search, the method further comprises:
issuing a request to a remote supplier to conduct a first search for items matching said description, without the user connecting to the remote procurement information source, wherein the remote supplier is an external supplier and/or vendor who is located outside of the organization to which the user belongs, and wherein requesting the remote supplier involves including information that enables the remote supplier to verify the identity of the procurement server and/or the user;
when the search involves a second search,
performing a second search of a local procurement system for items matching said description; and
receiving results of the second search;
receiving a first set of results responsive to said first search, wherein the verification of the identity of the procurement server and/or user enables the results of the first search to be customized for the organization to which the user belongs;
filtering said first set of results by applying the organizational procurement controls to the first set of results of the remote search, whereby the organizational procurement controls can be applied to the first set of results of the remote search which is performed by the remote supplier;
masking the sources of information in the first set of search results to prevent the user from purchasing from the remote supplier; and
presenting to the user, through a single interface, said filtered first set of results, when the said first search is involved, and the second set of results responsive to said second search, when the said second search is involved.

16. The method of claim 15, further comprising:
authenticating one or more of the user and the local procurement information system to the remote procurement information source.

17. The method of claim 15, further comprising:
selecting the remote procurement information source from a set of procurement information sources.

18. The method of claim 15, wherein said filtering comprises removing from said first set of results any items that violate the procurement rules.

19. The method of claim 18, wherein the procurement rules are designed to restrict items that may be procured by the user.

20. The method of claim 15, wherein said first search and said second search are performed at least partially in parallel.

21. The method of claim 15, wherein the organizational procurement controls include at least one of, an upper limit on a price, an upper limit on a quantity, a prohibition against a given supplier, a limit to a given brand, a limit to a given model, a limit on a delivery option, and a limit on payment terms.

22. The method of claim 15, wherein said issuing comprises providing the remote procurement information source with information for identifying a context in which to execute the requested search.

23. A computer readable storage medium storing instructions that, when executed by a computer, cause the computer to perform a method for conducting a distributed electronic search for a procurement request, the method comprising:
receiving from a user a description of an item the user desires to procure;
using organizational procurement controls to determine if the search involves a first search and/or a second search;
when the search involves a first search, the method further comprises:
issuing a request to a remote supplier to conduct a first search for items matching said description, without the user connecting to the remote procurement information source, wherein the remote supplier is an external supplier and/or vendor who is located outside of the organization to which the user belongs, and wherein requesting the remote supplier involves including information that enables the remote supplier to verify the identity of the procurement server and/or the user;
receiving a first set of results responsive to said first search, wherein the verification of the identity of the procurement server and/or user enables the first set of results responsive to the first search to be customized for the organization to which the user belongs;

masking the sources of information in the remote search result to prevent the user from purchasing from the remote supplier; and filtering said first set of results by applying the organizational procurement controls to the first set of results of the remote search whereby the organizational procurement controls can be applied to the first set of results of the remote search which is performed by the remote supplier;

when the search involves a second search, performing a second search of a local procurement system for items matching said description; and receiving results of the second search;

and presenting to the user, through a single interface, said filtered first set of results, when the first search is involved, and the second set of results responsive to said second search, when the second search is involved.

24. A system for facilitating a distributed search for information for a procurement request by a procurement server, comprising:

a determination mechanism using organizational procurement controls configured to determine if the search involves a local search and/or a remote search;

a local information source configured to use the results of the determination mechanism and, when the search involves a local search, provide information to local users in an organization through a first user interface;

a communication module configured to use the results of determination mechanism, and, when the search involves a remote search, enable said local information source to communicate with a remote supplier, wherein the remote supplier is configured to provide information to users through a second user interface different from the first user interface, and wherein the remote supplier is an external supplier and/or vendor who is located outside of the organization to which the user belongs, and wherein communicating with the remote supplier involves including information that enables the remote supplier to verify the identity of the procurement server and/or the users;

a set of rules regarding information that may be displayed to a first local user; and a processor configured to initiate, in response to a request from the first local user:

a remote search of the remote information source, when the search involves a remote search, wherein the verification of the identity of the procurement server and/or user enables the results of the remote search to be customized for the organization to which the user belongs; and a local search of said local information source, when the search involves a local search;

wherein the sources of information in the remote search result are masked to prevent the user from purchasing from the remote supplier; and wherein results of said remote search are filtered by applying the organizational procurement controls to the results of the remote search, whereby the organizational procurement controls can be applied to results of the remote search which is performed by the remote supplier, when the remote search is involved, and then merged with results of said local search, when the local search is involved, for display to the first local user through the first user interface.

25. The system of claim 24, further comprising:

authentication means for authenticating one or more of the system and the first local user to the remote information source.

26. The system of claim 24, wherein said remote search and said local search are performed in parallel.

27. The system of claim 24, wherein the organizational procurement controls include at least one of, an upper limit on a price, an upper limit on a quantity, a prohibition against a given supplier, a limit to a given brand, a limit to a given model, a limit on a delivery option, and a limit on payment terms.

* * * * *